US007477738B2

(12) United States Patent
Rajamma

(10) Patent No.: US 7,477,738 B2
(45) Date of Patent: Jan. 13, 2009

(54) DATA SEQUENCE ENCRYPTION AND DECRYPTION

(75) Inventor: Ajith Kumar Parameswaran Rajamma, Nagarcoil (IN)

(73) Assignee: General Instrument Corporation, Horsham, PA (US)

(*) Notice: Subject to any disclaimer, the term of this patent is extended or adjusted under 35 U.S.C. 154(b) by 503 days.

(21) Appl. No.: 11/275,260

(22) Filed: Dec. 21, 2005

(65) Prior Publication Data

US 2007/0140481 A1    Jun. 21, 2007

(51) Int. Cl.
*H04L 9/08* (2006.01)
(52) U.S. Cl. .................. 380/44; 380/210; 380/278
(58) Field of Classification Search .............. 380/44
See application file for complete search history.

(56) References Cited

U.S. PATENT DOCUMENTS

| 5,796,839 | A  | * | 8/1998 | Ishiguro ............... 380/44 |
| 6,049,878 | A  | * | 4/2000 | Caronni et al. ........... 726/3 |
| 6,363,149 | B1 | * | 3/2002 | Candelore .............. 380/45 |
| 2007/0127719 | A1 | * | 6/2007 | Selander et al. ......... 380/277 |

FOREIGN PATENT DOCUMENTS

WO    2005/038818    4/2005

OTHER PUBLICATIONS

Aslihan Celik and Anindya Datta, "DG: A Scalable Approach for Broadcasting Data Securely in Wireless Networks," Wireless Networks 9, pp. 249-259, 2003.

* cited by examiner

*Primary Examiner*—Gilberto Barron, Jr.
*Assistant Examiner*—Minh Dinh
(74) *Attorney, Agent, or Firm*—Stewart M. Wiener

(57) ABSTRACT

A device and method of encrypting a sequence. The method (300) encrypts data ($D_i$) over a sequence of encryption periods ($T_i$) by generating (315) a sequence of forward encryption keys ($GK^F_i$) each associated with a respective encryption period ($T_i$). Each forward encryption key is generated recursively by applying a forward one way function ($F^F_{i-1}$) to the forward encryption key ($GK^F_{i-1}$) associated with the preceding encryption period ($T_{i-1}$). Next the method (300) generates (320) a sequence of reverse encryption keys ($GK^R_i$), each associated with a respective encryption period ($T_i$), each reverse encryption key being generated recursively by applying a reverse one way function ($F^R_{i-1}$) to the reverse encryption key ($GK^R_{i+1}$) associated with the subsequent encryption period ($T_{i+1}$). Encrypting (325) the data ($D_i$) for each encryption period ($T_i$) with a respective forward encryption key ($GK^F_i$) and a respective reverse encryption key ($GK^F_i$) is then performed.

15 Claims, 5 Drawing Sheets

DATA SEQUENCE ENCRYPTION AND DECRYPTION

FIELD OF THE INVENTION

The present invention relates generally to the field of encryption and decryption, and in particular though not exclusively to the field of encrypting broadcast data.

BACKGROUND OF THE INVENTION

With the increased bandwidth provided by third generation mobile phone technologies such as CDMA2000 and UMTS, providing secure access control in broadcast schemes for electronic devices incorporating these technologies is an active research area. Examples of broadcasting services include providing highlights of sporting fixtures and recent news, popular music audio and accompanying video tracks, weather and financial market updates, popular soap or comedy TV programs, and even movies. Whilst such content may be broadcast continuously, a subscriber will typically only want to subscribe to some of this content for a correspondingly limited duration or subscription period. The content is encrypted prior to broadcast, and a subscriber must obtain the appropriate decryption key by subscribing using some form of payment in order to access the desired content. Various encryption schemes are known in order to address how to allow access to the encrypted content for different subscribers over different periods.

The conventional group key scheme provides a common decryption key to all members of a subscription group which each want to access the same content, for example a music video. However this scheme has a high key management and transmission overhead as the group of subscribers is often changing, requiring changing the keys of the group and retransmitting the keys to all members of the group when a new user joins/leaves. This is very costly and impractical in a highly dynamic broadcast subscription environment, such as in a wireless network where subscribers will typically only want content of short duration.

Another approach is the Point-to-Point (PTP) protocol in which a server sends an individual copy of the data item for each subscriber. However this requires a separate key for each subscriber and therefore increases the key management and transmission/bandwidth requirements, as well as the broadcast bandwidth requirements.

An intermediate approach is the Group Key (GK) method which forms groups of clients for each data item and assigns a key for the group that remains valid until the group changes. In such a system it is necessary to change the group key every time a user joins or leaves the subscription. For a user leaving the subscription it is necessary to change the GK to prevent the user from accessing the future broadcast content. For a user joining the subscription it is necessary to change the GK to prevent the user from accessing the previous broadcast content. The GK approach performs well when the groups do not change very often, however in applications where there are a large number of users and frequent additions or deletions to the group membership this key management scheme can introduce a significant management and communication burden. Broadcasting in a wireless network environment is highly dynamic in terms of subscribers joining and dropping from broadcasts. Furthermore the bandwidth for transmitting keys to subscribers is limited.

The Drop Groups (DG) protocol attempts to address this scalability problem by a grouping criterion which assigns each subscriber to predetermined groups, and assigns each group a group key valid until the group changes. In DG a group of data items are further divided into subgroups using an additional criterion, the time to drop, which is simply the amount of time until a subscriber's subscription for a data item expires. Subscription expirations are bunched together at discrete epochs, however if the minimum epoch length is 1 hour, and a subscriber wants to subscribe to a data item for 2.5 hours, according to DG it must choose to subscribe for either two or three hours.

SUMMARY OF THE INVENTION

In general terms in one aspect the present invention provides a method of encrypting a sequence of data ($D_i$) over a corresponding sequence of encryption periods ($T_i$). The data may correspond to various data items, and the encryption periods to broadcast periods for example. In an embodiment each broadcast period may correspond to a broadcast packet such as an MP4 packet for example, or alternatively to a fixed duration such as one second. The method uses two recursively generated groups of encryption keys ($GK_i$) for encrypting a respective sequence of data ($D_i$), and both encryption keys are needed to decrypt a particular data block, such as a packet or duration of broadcasting. Each group of encryption keys can be calculated recursively from a previous key in the sequence, using respective one-way functions ($F^F$ and $F^R$). However in one of the encryption key groups (reverse), the sequence progresses backward in time. In other words, to calculate an encryption key ($GK^R_i$) in this reverse group which is associated with a particular encryption period ($T_i$), it is necessary to know the encryption key ($GK^R_{i+1}$) associated with the subsequent encryption period ($T_{i+1}$). In the other encryption key group (forward), the sequence progresses forward in time, and in order to calculate an encryption key ($GK^F_i$) in this forward group (and which is associated with a particular encryption period), it is necessary to know the encryption key ($GK^F_{i-1}$) associated with the preceding encryption period ($T_{i-1}$).

Thus in order to provide a subscription to a subset ($T_1$-$T_3$) of a larger sequence of broadcast periods ($T_0$-$T_4$), a sequence of data items ($D_0$-$D_4$) or blocks comprising the broadcast are encrypted using the forward ($GK^F_0$-$GK^F_4$) and reverse ($GK^R_0$-$GK^R_4$) groups of encryption keys. Each broadcast or encryption period (eg $T_2$) is associated with a data item or block ($D_2$), and that data item or block is encrypted using respective forward ($GK^F_2$) and reverse ($GK^R_2$) encryption keys. The groups of keys can be calculated recursively from an initial key in each group, the initial key in the forward group ($GK^F_0$) corresponds to the first encryption period ($T_0$), whereas the initial key in the reverse group ($GK^R_4$) corresponds to the last encryption period ($T_4$). A subscriber subscribing to the broadcast between intermediate times ($T_1$-$T_3$) corresponding to a subscription period receives the forward ($GK^F_1$) and reverse ($GK^R_3$) keys associated with the start ($T_1$) and end ($T_3$) of the subscription period respectively, and can then calculate the intermediate keys ($GK^F_2$, $GK^F_3$, and $GK^R_2$, $GK^R_1$) for the intermediate encryption or broadcast periods ($T_1$-$T_3$). However as the keys are generated using one-way functions ($F^F$ and $F^R$ respectively), it is not possible to generate forward keys prior to the subscription start period ($T_1$)—though it is possible to calculate reverse keys earlier than this time—and it is not possible to generate reverse keys after the subscription end period. As both keys are required to decrypt a data item from a respective encryption period, the subscriber is limited to decrypting data items from the subscription period.

In another aspect there is provided an encryption apparatus comprising: a server arranged to generate a sequence of forward encryption keys ($GK^F_i$) each associated with a respective encryption period ($T_i$), each forward encryption key generated recursively by applying a forward one way function ($F^F_{i-1}$) to the forward encryption key ($GK^F_{i-1}$) associated with the preceding encryption period ($T_{i-1}$); the server further arranged to generate a sequence of reverse encryption keys ($GK^R_i$) each associated with a respective encryption period ($T_i$), each reverse encryption key generated recursively by applying a reverse one way function ($F^R_{i+1}$) to the reverse encryption key ($GK^R_{i+1}$) associated with the subsequent encryption period ($T_{i+1}$); the server further arranged to encrypt the data ($D_i$) for each encryption period ($T_i$) with a respective forward encryption key ($GK^F_i$) and a respective reverse encryption key ($GK^F_i$). In an embodiment this server may be a broadcast server which is arranged to broadcast the encrypted data.

In an embodiment the server may be further arranged to send a forward encryption key ($GK^F_m$) associated with a start subscription encryption period ($T_m$) and a reverse encryption key ($GK^R_{m+x}$) associated with an end subscription encryption period ($T_{m+x}$) in response to receiving a subscription request. Alternatively, the initial forward and reverse encryption keys for an entire sequence of encryption periods may be sent.

In another aspect of the present invention there is provided an electronic device, and/or a computer program which when executed on a suitable processor is, arranged to carry out the methods described herein.

BRIEF DESCRIPTION OF THE DRAWINGS

In order that the invention may be readily understood and put into practical effect, reference will now be made to an exemplary embodiment as illustrated with reference to the accompanying figures, where like reference numerals refer to identical or functionally similar elements throughout the separate views. The figures together with a detailed description below, are incorporated in and form part of the specification, and serve to further illustrate the embodiments and explain various principles and advantages, in accordance with the present invention where.

Figure 1:
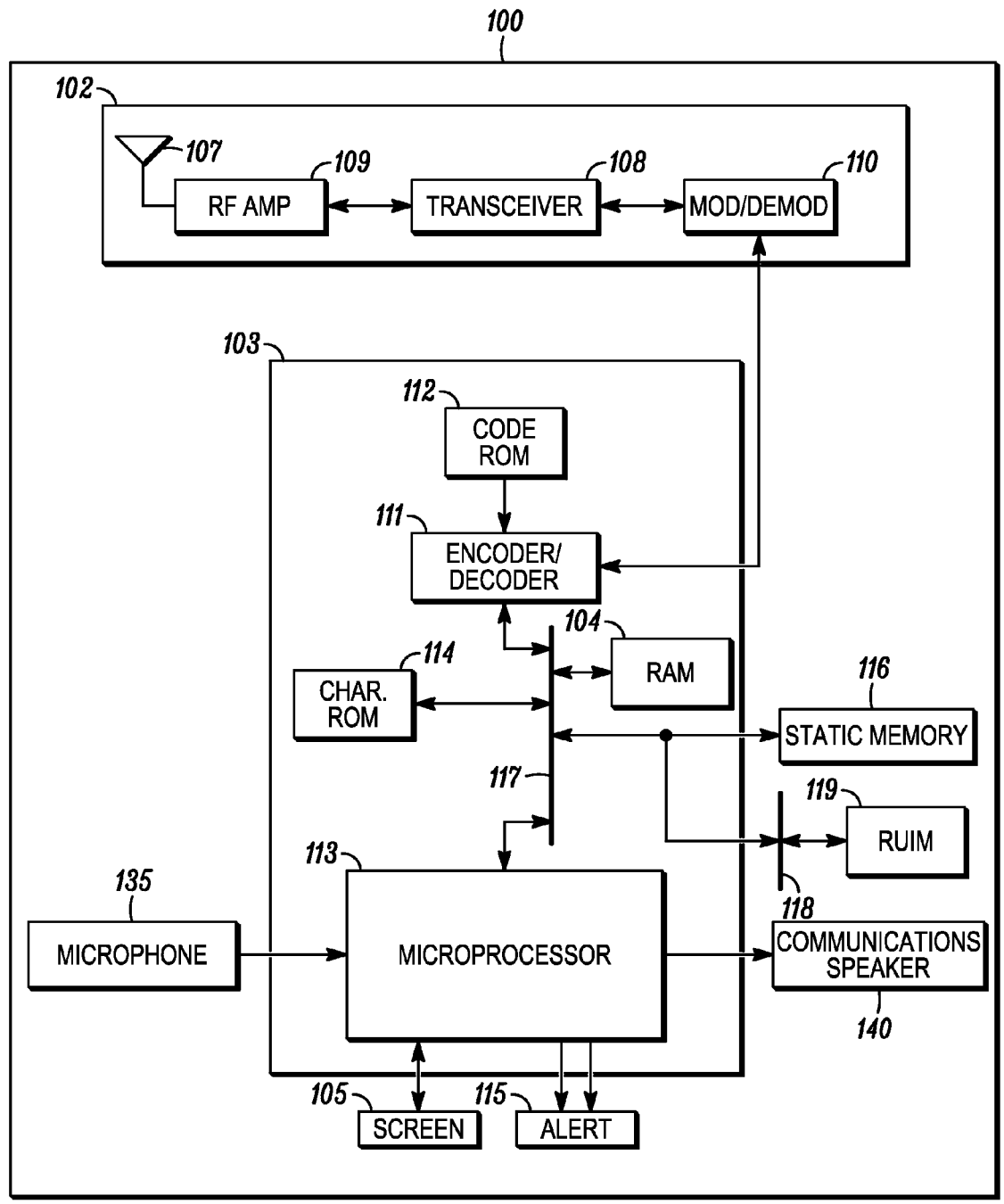
FIG. 1 is a schematic of an electronic device suitable for use with the embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to the activation and deactivation of a restricted service provider mode in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. Also, throughout this specification the term "key" has the broad meaning of any key, button or actuator having a dedicated, variable or programmable function that is actuatable by a user.

It will be appreciated that embodiments of the invention described herein may be comprised of one or more conventional processors and unique stored program instructions that control the one or more processors to implement, in conjunction with certain non-processor circuits, some, most, or all of the functions of activation and deactivation of a restricted service provider mode in an electronic device described herein. The non-processor circuits may include, but are not limited to, a radio receiver, a radio transmitter, signal drivers, clock circuits, power source circuits, and user input devices. As such, these functions may be interpreted as steps of a method for activation and deactivation of a restricted service provider mode in an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, there is a schematic diagram illustrating an electronic device 100, typically a wireless communications device, in the form of a mobile station or mobile telephone comprising a radio frequency communications unit 102 coupled to be in communication with a processor 103. The electronic device 100 also has a display screen 105. There is also an alert module 115 that typically contains an alert speaker, vibrator motor and associated drivers. The display screen 105, and alert module 115 are coupled to be in communication with the processor 103.

The processor 103 includes an encoder/decoder 111 with an associated code Read Only Memory (ROM) 112 for storing data for encoding and decoding voice or other signals that may be transmitted or received by the electronic device 100. The processor 103 also includes a micro-processor 113 coupled, by a common data and address bus 117, to the encoder/decoder 111, a character Read Only Memory (ROM) 114, a Random Access Memory (RAM) 104, static programmable memory 116 and a Removable User Identity Module (RUIM) interface 118. The static programmable memory 116 and a RUIM card 119 (commonly referred to as a Subscriber Identity Module (SIM) card) operatively coupled to the RUIM interface 118 each can store, amongst other things, Preferred Roaming Lists (PRLs), subscriber authentication data, selected incoming text messages and a Telephone Number Database (TND phonebook) comprising a number field for telephone numbers and a name field for identifiers associated with one of the numbers in the name field. The RUIM card 119 and static memory 116 may also store passwords for allowing accessibility to password-protected functions on the mobile telephone 100.

The micro-processor 113 has ports for coupling to the display screen 105, and the alert module 115. Also, microprocessor 113 has ports for coupling to a microphone 135 and al communications speaker 140 that are integral with the device.

The character Read Only Memory 114 stores code for decoding or encoding text messages that may be received by the communications unit 102. In this embodiment the character Read Only Memory 114, RUIM card 119, and static memory 116 may also store Operating Code (OC) for the micro-processor 113 and code for performing functions associated with the mobile telephone 100.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that couples the communications unit 102 to the processor 103.

Figure 2:
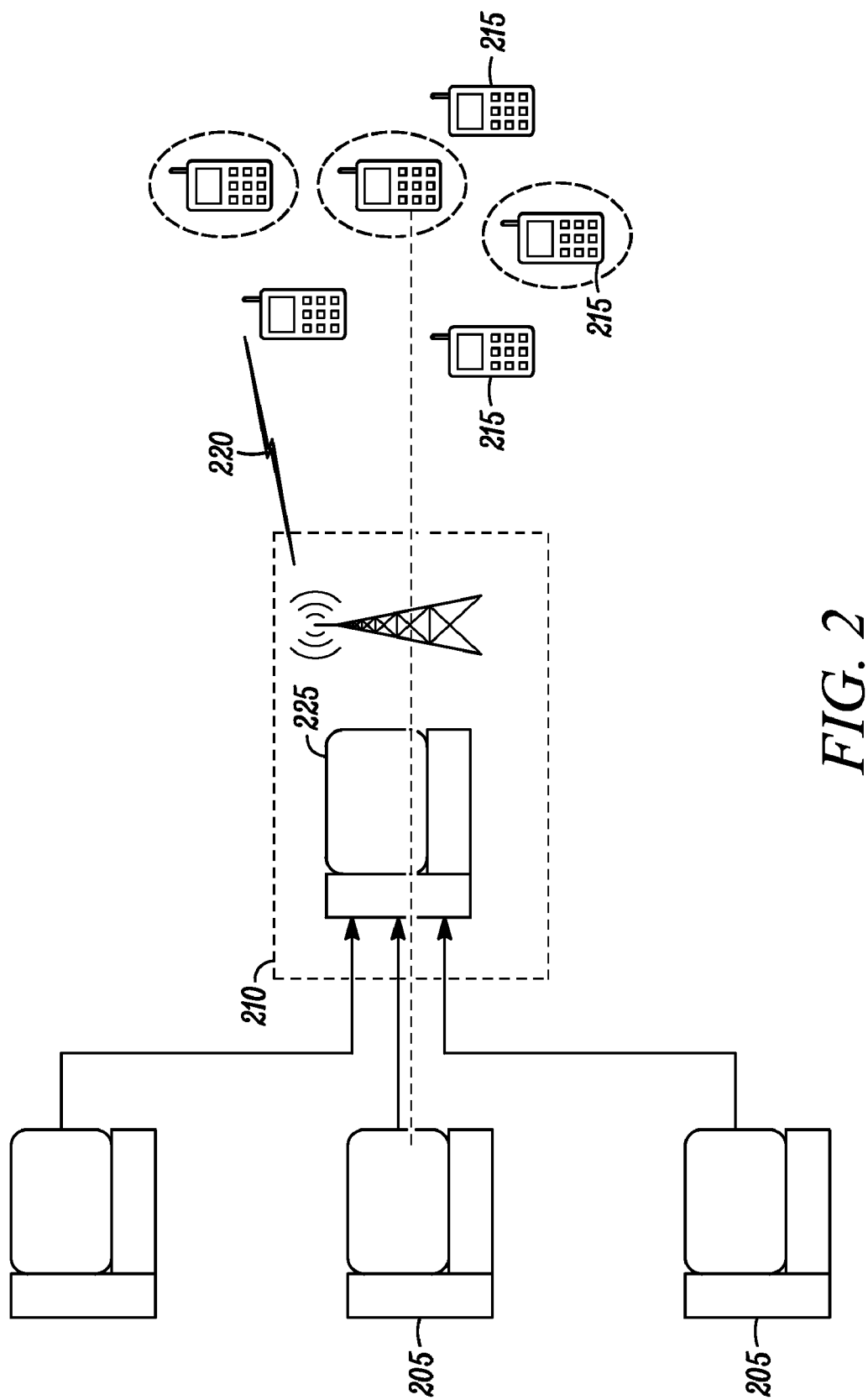
FIG. 2 is a schematic illustrating a broadcast system for a wireless network.

FIG. 2 shows a system for broadcasting data items to electronic devices connected to a wireless network. The system 200 comprises a number of content or data item providers 205 such as weather and traffic update providers, radio stations, movie channels, news services and shopping channels. These content providers 205 are coupled to a wireless communications network 210 such as a CDMA2000 or UMTS cellular network, or a WLAN provided by a hotel or airport for example. A number of electronic devices 215 such as mobile phones or wireless enabled PDA's are coupled to the network 210 by an air interface 220 as is known. The electronic devices 215 are subscribers of the wireless network 210, and those circled also subscribe to the content services provided by the content providers 205. The wireless network 210 may comprise a broadcast server 225 which receives content from the content providers, encrypts the broadcast data, and manages subscriptions with the electronic devices 215.

The network 210 may be configured to continuously broadcast the content from the content providers 205, or such broadcasts may be dependent on demand by the subscribers (215) of the network 210 in order to minimise the bandwidth consumed. The broadcast content will be encrypted in order to ensure that only subscribing electronic devices can access it. Typically the content will be divided into a sequence of data items such as packets. Various encoding mechanisms can be used for encoding the content, and this may depend on the data to be broadcast. For example video content may be encoded using the MP4 format, whereas audio content may be encoded using the MP3 format for example. The data items may be grouped into blocks corresponding to a broadcast period such as one second. Each data item or block of data items may be encrypted with a respective encryption key, so that for example a 60 second broadcast may require 60 encryption keys, one to encrypt each second of broadcast time.

Figure 3:
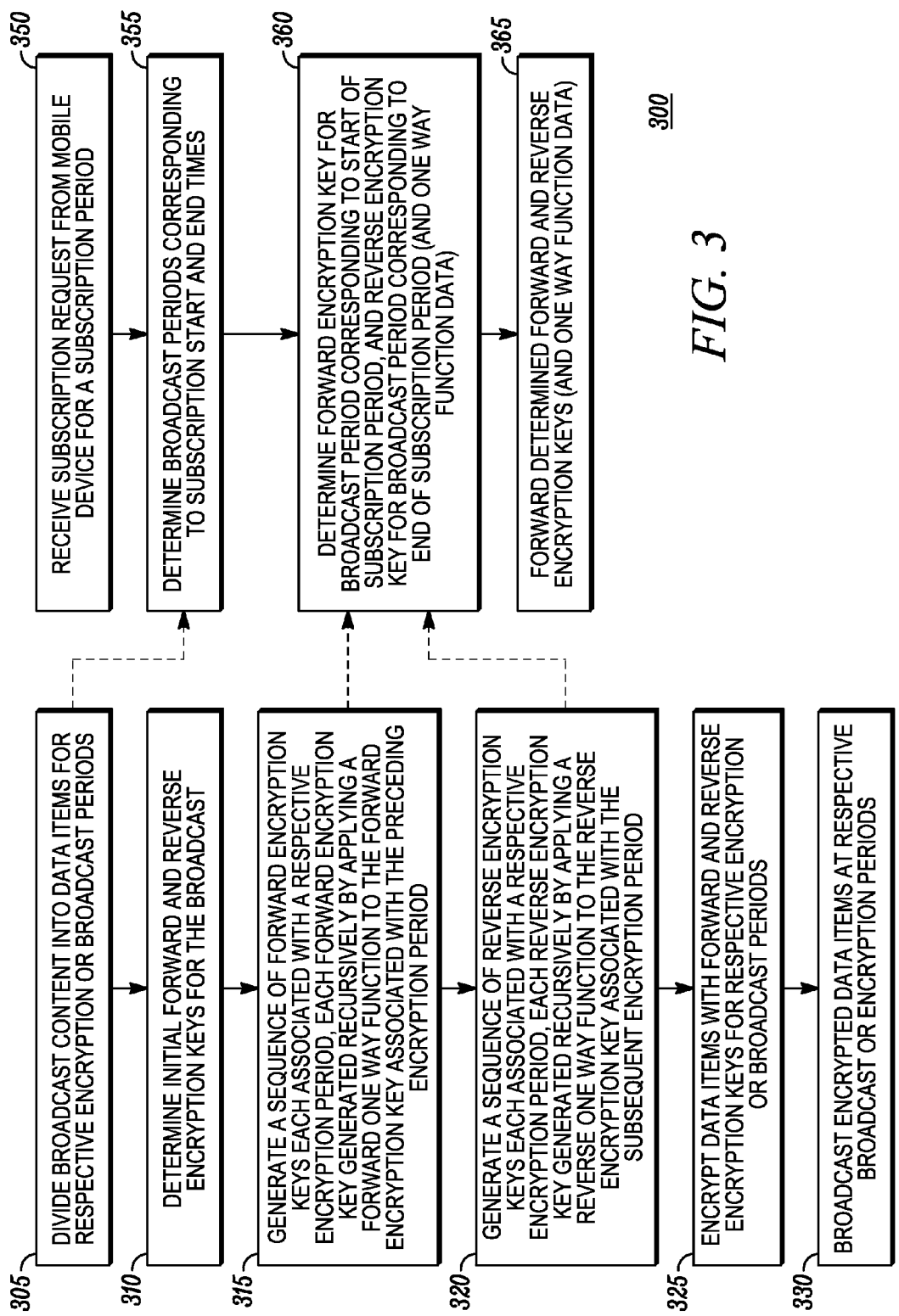
FIG. 3 is a flow chart illustrating a method of broadcasting data items.

A method of encrypting and broadcasting a sequence of data is illustrated in FIG. 3. This method (300) may be implemented at the content provider's servers 205 in which case the broadcasting step refers to forwarding the encrypted data to the network 210 for broadcasting. Alternatively the method (300) may be implemented at the network 210 and more specifically at a broadcast server 225, the content or data having been forwarded by the content providers 205 for encryption according to an embodiment by the network 210. The data may have been forwarded from the content provider's servers 205 to the network 210 using a different encryption scheme, for example using a shared secret key or public key cryptography. In a further alternative, the method (300) may be implemented and split over both the content providers 205 and the network 210.

The method (300) divides the broadcast content into data items or blocks of data, each to be broadcast over a respective broadcast period (305). Thus for example a number of MP4 packets may be broadcast over a one second broadcast period, or each MP4 packet, a data item, may be broadcast over its own respective broadcast period which may be a fixed fraction of a second or which may be variable and dependent on the time it takes to transmit the data item.

Next, initial forward and reverse encryption keys are determined (310). These may simply be random numbers generated by the content provider 205 or network 210 as appropriate. The initial forward encryption key $(GK^F_0)$ corresponds with the first or initial broadcast period $(T_0)$, and the initial reverse encryption key $(GK^F_n)$ corresponds with the final or last broadcast period $(T_n)$.

The method then generates a number of forward encryption keys (315), each corresponding to an encryption or broadcast period and which is used to encrypt the data to be broadcast during that broadcast period. The forward encryption keys $(GK^F_i)$ are generated recursively using a forward one way function $(F^F_i)$ and starting with the initial forward encryption key $(GK^F_0)$. Thus the second forward encryption key $(GK^F_1)$ is determined from a forward one way function $(F^F_0)$ applied to the initial or first forward encryption key $(GK^F_0)$, the third forward encryption key $(GK^F_2)$ is determined from a forward one way function $(F^F_1)$ applied to the second forward encryption key $(GK^F_1)$, and so on.

This can be written mathematically as follows:

$$GK^F_1 = F^F_0(GK^F_0)$$
$$GK^F_2 = F^F_1(GK^F_1)$$
$$\ldots$$
$$\ldots$$
$$\ldots$$
$$GK^F_n = F^F_{n-1}(GK^F_{n-1})$$

or more generally as:

$$GK^F_i = F^F_{i-1}(GK^F_{i-1}), \text{ where } i=0-n$$

One-way-functions are also known as hash functions, and comprise a mathematical function which takes an input string and converts it into an output string. A one-way function is designed in such a way that it is very difficult computationally to reverse the process, that is to find the input string from the output string. A good one-way-function also makes it very difficult to find two input strings that would produce the same output string. Secure Hash Algorithm (SHA), a family of Message Digest (MD) algorithms (MD5 for example), and CRC checksum are examples of one-way-functions. Any of these with or without additional modifications can be used for generating recursive forward and reverse group keys.

The forward one way function ($F^F_i$) applied to each respective forward encryption key ($GK^F_i$) to get the next forward encryption key ($GK_{Fhd\ i+1}$) may be specific to the respective forward encryption key ($GK^F_i$), or the same forward one way function ($GK^F$) may be used on each forward encryption key ($GK^F_i$). Similarly the reverse one way function ($F^R_i$) applied to each respective reverse encryption key ($GK^R_i$) to get the next reverse encryption key ($GK^R_{i-1}$) may be specific to the respective reverse encryption key ($GK^F_i$), or the same reverse one way function ($GK^R$) may be used on each reverse encryption key ($GK^R_i$). Indeed the forward and reverse one way functions ($F^R_i$ and $F^R_i$) may be the same, either the same for the encryption keys ($GK^F$ and $GK^R_i$) for respective broadcast periods ($T_i$), or the same ($F^R$ and $F^R$) for all encryption keys ($GK^F$ and $GK^R$). This is illustrated in more detail with respect to FIG. 4.

Figure 4:
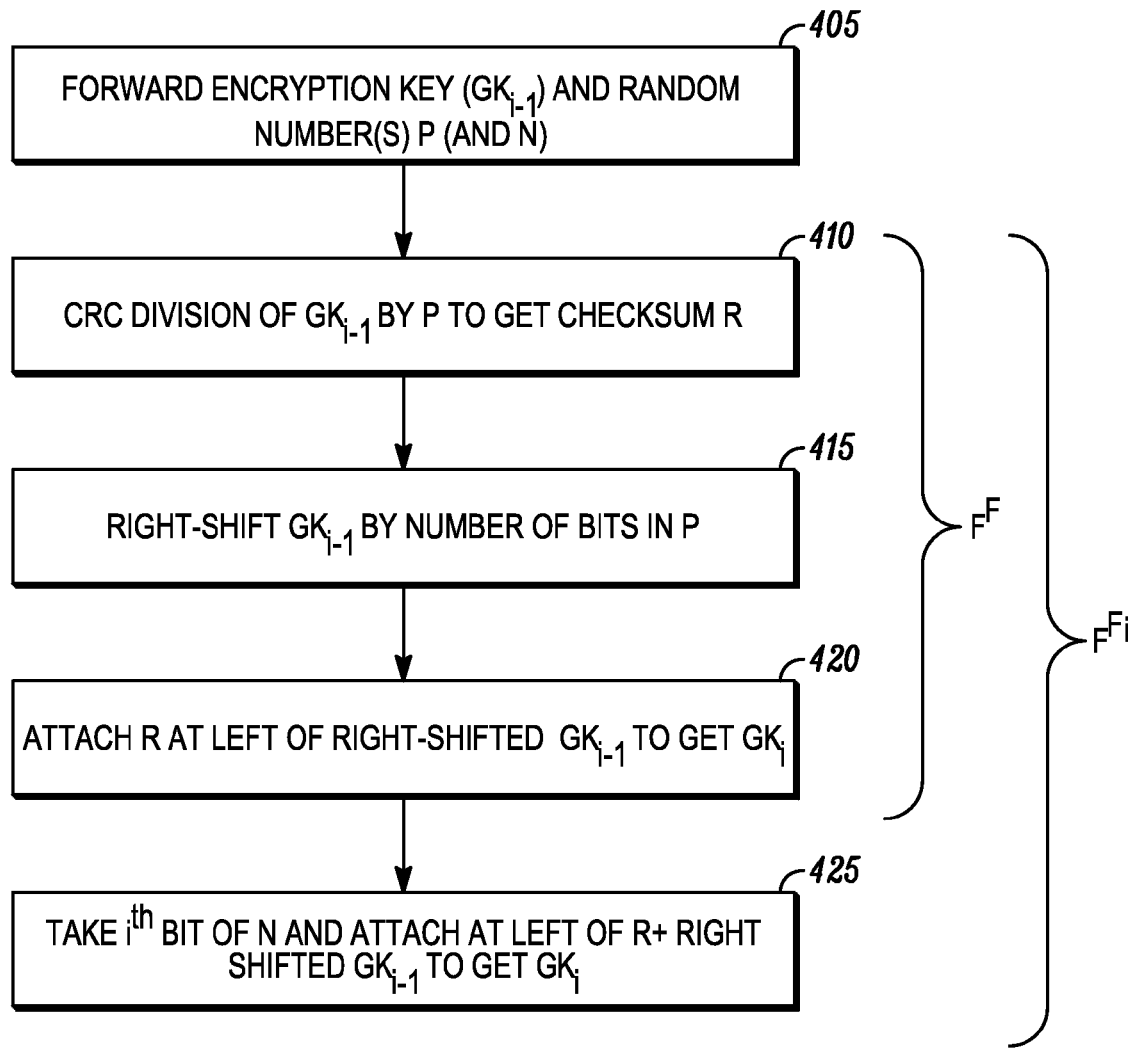
FIG. 4 illustrates a one-way function according to an embodiment.

FIG. 4 illustrates a method of generating a forward encryption key ($GK^F_{i+1}$) from the forward encryption key ($GK^F_i$) associated with the preceding broadcast or encryption period ($T_i$) The method (400) incorporates a one way function that may be used for either or both the forward or reverse one way functions ($F^R_i$ or $F^R_i$) of an embodiment. Many other one way functions will be available to those skilled in the art, and these could alternatively be used.

The method (400) receives or uses an available forward encryption key ($GK^F_i$) together with a random number P (405). In embodiments where the one way function ($F^F_i$) is specific to the encryption period ($T_i$) or key ($GK^F_i$) used, a second random number N is also provided. The number of bits in the second random number N is equal to the number of data items or encryption periods. Example values for these variables are:

$$(GK^F_i) = 0101011110$$

$$P = 10011$$

$$N = 10110100\ldots$$

(For a broadcast with 1000 broadcast periods, N will have 1000 bits)

In the first step of the one way function ($F^F_i$), the current or received forward encryption key ($GK^F_i$) is cyclic redundancy check (CRC) divided by the first random number P (410). This procedure will be well known by those skilled in the cryptography arts, and results in a CRC checksum here labelled R. A simple algorithm for calculating the CRC checksum is given below:

1. Pre-load a register with zero bits (Register length= (Number of bits in P)−1=L)
2. Augment the forward encryption key ($GK^F_i$) by appending L zero bits to the end of it.
3. While (there exists message bits)
   3a. Shift the register left by one bit, reading the next bit of the augmented message into register bit position 0.
   3b. If (a 1 bit popped out of the register during step 3a)
       3bi. Register=(Register) XOR (last four bits of P)

The register now contains the checksum R. Using the example values given above, the CRC division of $GK^F_i$=0101011110 by P=10011 results in a checksum R=1100.

Next, the current forward encryption key ($GK^F_i$) is right-shifted by the number of bits in the first random number P (415). In the example above P has 5 bits which gives $RS((GK^F_i))=01010$.

Next, the checksum R is attached to the left of the right-shifted (RS) forward encryption key (420). Again using the example values this gives $R+RS((GK^F_i))=110001010$. Where the second random number N is not used and the forward one way function ($F^F$) is the same for each encryption key generation, the result of step (420) is the next forward encryption key ($GK^F_{i+1}$).

The second random number N can be used to provide a more secure forward encryption key ($GK^F_i$) for each encryption period ($T_i$), and has the effect of making the succession of forward encryption keys more random. This second random number N can also be used to make it difficult for a re-joining subscriber for the same broadcast to view the packets between the subscriber's two subscribing periods. Where a one way function ($F^F_i$) specific to each encryption period ($T_i$) is used, this is implemented in the present embodiment using the second random number N, and where an additional method step is performed (425). A bit ($b_i$) from this second random number N is taken which corresponds with the encryption period ($T_i$) currently being used. Thus for example if the forward encryption key ($GK^F_{100}$) for the data item for the 100$^{th}$ broadcast period is being calculated, the 99$^{th}$ bit ($b_{99}$) of the second random number N is used. The corresponding bit from the second random number N is then attached to the left of the result of the preceding operation (420)—that is where the checksum R was attached to the left of the right-shifted forward encryption key. The result is the next forward encryption key ($GK^F_{i+1}$). Using the example values given, and where the corresponding bit ($b_i$) of the second random number N is 1, the new forward encryption key ($GK^F_{i+1}$) is 1110001010.

Returning to FIG. 3 and the step (315) of generating the forward encryption keys ($GK^F_0$-$GK^F_n$) for all of the broadcast periods ($T_0$-$T_n$). Following generation of all the required forward encryption keys, the method proceeds to generate all of the required reverse encryption keys ($GK^R_i$) (320). This operation is similar to that for generating the forward encryption keys, except that the initial reverse encryption key ($GK^R_n$) corresponds to the final or last broadcast or encryption period ($T_n$). The recursively generated reverse encryption keys ($GK^R_i$) correspond to progressively earlier broadcast times ($T_i$). Successive reverse encryption keys ($GK^R_i$) are generated using the previously generated reverse encryption key ($GK^R_{i+1}$), which corresponds with a subsequent or later broadcast time ($T_{i+1}$), and a reverse one way function ($F^R$). As with the forward one way function, the reverse one way function ($F^R_i$) may be specific to each broadcast period ($T_i$) or reverse encryption key ($GK^R_i$), or the forward one way function ($F^R$) may be the same for all broadcast periods (T). In an embodiment the one way function described with respect to FIG. 4 may also be used as the reverse one way function ($F^R$), and using the second random number N, the reverse one way function ($F^R_i$) may be made specific for each encryption period ($T_i$).

Having generated the sequences of forward and reverse encryption keys ($GK^F_i$ and $GK^R_i$), the method (300) proceeds to encrypt the data items associated with each broadcast period ($T_i$) with the respective reverse encryption key ($GK^R_i$) and the respective forward encryption key ($GK^F_i$) (325). The encrypted data items or blocks of data $(GK^R_i((GK^R_i(D_i)))$ are then broadcast during their respective broadcast periods $(T_i)$ (330).

The initial forward and reverse encryption keys may be updated periodically in order to generate new sequences of forward and reverse encryption keys. For example, the method may be re-run for a given horizon period, such as 24 hours; which is then divided into broadcast periods for example of one second duration each. Another time to update the forward and reverse encryption keys may be when a subscriber who has already subscribed for a short duration which has since finished then re-joins for another short duration. If the key generation doesn't use the random number N, it is possible for the subscriber to view the content of broadcast between these two subscription periods. One solution is to disallow any re-joining during one broadcast. Another solution is to update the pair of encryption keys and transmit the new keys to all subscribers. A further solution is to use the additional random number N.

In an embodiment the broadcast of the encrypted data items is over a wireless network to wireless electronic devices, however other broadcast or transmission means could be used. For example an embodiment might utilize satellite or Internet based broadcast technology, for example to satellite broadcast TV programs or stream multimedia content respectively. Indeed, embodiments may also be used for one-to-one transmissions rather than one-to-many broadcasts.

Typically a wireless network broadcast consists of Data Blocks following a Broadcast Index, and in which there is only one Data Block per broadcast period in the broadcast. The Broadcast index contains tuning information such as the offset to a particular data item in the broadcast. When a subscriber wishes to access the broadcast service, it first contacts a content or broadcast server 225 that handles subscription requests. After exchanging information with the content server, and obtaining the decryption keys and instructions for calculating them for the data items, the subscriber accesses the broadcast prepared by the broadcast server until its subscription expires.

This arrangement according to an embodiment is illustrated by the remaining (parallel) steps of FIG. 3. The network 210 or content provider 205 receives a request from a mobile device 215 to subscribe to a broadcast for a subscription period (350). The request will typically include start and end subscription times, or a reference to the desired content, together with the requesting device's public key. Assuming the subscription request is legitimate and/or adequate payment is received, the method (300) then determines a sequence of broadcast periods $(T_s-T_e)$ from a start subscription period $(T_s)$ to an end subscription period $(T_e)$ corresponding to the subscription start and end times or the specified content (355). The forward encryption key $(GK^F_s)$ corresponding to the start subscription broadcast period $(T_s)$ and the reverse encryption key $(GK^R_e)$ corresponding to the end subscription broadcast period $(T_e)$ are then determined (360). These encryption keys were generated previously at step (315) of the broadcasting sequence of steps. The determined forward encryption key $(GK^F_s)$ and the reverse encryption key $(GK^R_e)$ are then transmitted to the electronic device 215 (365).

Additionally the respective forward and reverse one way function ($F^F_i$ and $F^R_i$) may also be transmitted as one way function data. Alternatively these one way functions may be partially or fully embedded in capable electronic devices 215. Typically these one way functions will comprise a series of mathematical calculations and may additionally include further numbers for use in these calculations, such as the first and second random numbers (P and N) discussed above with respect to FIG. 4.

Where the one way functions are related or specific to the broadcast period, then an appropriate instruction or further one way function data (eg N) may be sent, which relates the one way functions to their respective broadcast periods. For example, in the one way function of FIG. 4, the second random number N contains the same number of bits as there are broadcast periods. Thus where a subscription period starting at the 100$^{th}$ broadcast period and ending at the 200$^{th}$ broadcast period is requested, then a second random number Nr provided to the requesting mobile device will comprises 100 bits, starting from the 100 bit of the originally used second random number N, and ending at the 200$^{th}$ bit of this originally used random number N.

Thus in a further alternative embodiment, the series of mathematical calculations may be embedded or stored in the electronics device, for example on a SIM or R-UIM card, and the further numbers such as the random numbers P and N may be transmitted to the electronic device as the one way function data in response to the subscription request. The encryption keys and the one way function data will typically be encrypted using the electronic device's public key prior to transmission over the wireless network.

An advantage of the described embodiments is that new keys are not required to be generated each time a subscriber joins or leaves a broadcast session. Instead, one set of encryption keys (both forward and reverse) are generated for a number of broadcast periods, and a joining subscriber only needs to be given the forward encryption key associated with the first subscription period and the reverse encryption key associated with the last subscription period, together if necessary with the forward and reverse one way function data. This significantly reduces the overhead and bandwidth required to provide encryption keys corresponding to different subscription periods for different subscribers, and is well suited to a dynamic broadcast subscription environment such as that provided by wireless networks such as the new third generation mobile phone systems.

Figure 5:
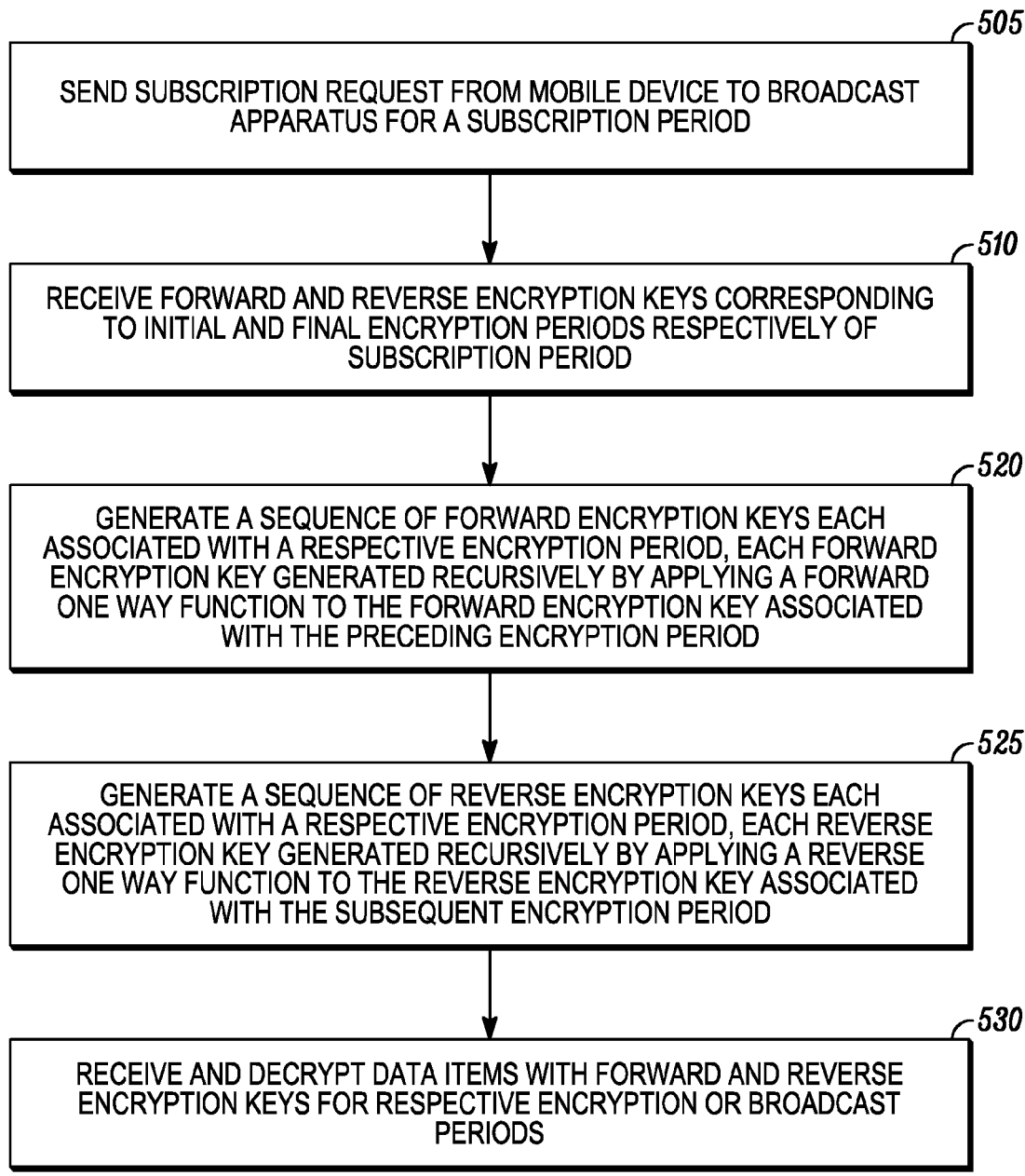
FIG. 5 is a flow chart illustrating a method of receiving broadcast data items.

FIG. 5 illustrates a method of receiving and decrypted encrypted broadcast data. The method (500), which may be implemented in an electronic device 215 connected to a wireless network 210, initially sends a subscription request to the network 210 and/or content provider 205 (505) for example using the radio frequency communications unit 102 of FIG. 1. The subscription request may include a subscription start and end time (Ts, Te), or a reference to the desired content such as a particular music video and audio track. The subscription request will typically also include the sender's public key and an identifier for the sender, so that the content provider and/or network can recover payment for the service. The method then receives from the content provider and/or network initial forward and reverse encryption keys ($GK^F_s$ and $GK^R_e$) which correspond to the subscription start ($T_s$) and end ($T_e$) times broadcast periods (510).

The method (500) then generates recursively a sequence of forward encryption keys ($GK^F_s$-$GK^F_e$) for respective broadcast periods ($T_s$-$T_e$) in the requested subscription period, and starting with the received initial forward encryption key ($GK^F_s$) and ending with a recursively generated forward encryption key ($GK^F_e$) corresponding with the final subscription period ($T_s$) (515). The mechanism for generating the forward encryption keys is the same as that used for generating the forward encryption keys at the broadcasting apparatus and as described with respect to FIG. 3 (315) and for example FIG. 4. The forward one way function data may also be received with the initial forward and reverse encryption keys (510), or alternatively this may be embedded in the receiver, for example in a SIM card provided by the operator of the wireless network. In a further alternative, part of the forward one way function data may be embedded in the receiver, for example the series of mathematical calculations to be performed on respective encryption keys in order to generate the succeeding one. In this case additional one way function data such as the random numbers (P and/or N) described with respect to FIG. 4 may be received by the electronic device in response to the subscription request.

Similarly the method (500) then generates recursively a sequence of reverse encryption keys ($GK^R_s$-$GK^R_e$) for respective broadcast periods ($T_s$-$T_e$) in the requested subscription period, and starting with the received initial reverse encryption key ($GK^F_s$) and ending with a recursively generated reverse encryption key ($GK^F_s$) corresponding with the first subscription period ($T_s$) (520). Mechanisms corresponding with the generating of reverse encryption keys for broadcasting (320) can be used for achieving this.

Finally, the method receives broadcast data and uses the generated forward and reverse encryption keys to decrypt data from respective broadcast periods (525). The decrypted data is then available for the electronic device to display, sound, or otherwise provide the broadcast data to a user of the electronic device 215.

The encrypted data requires both a respective forward encryption key and a respective reverse encryption key in order to be decrypted, in other words only broadcast periods for which overlapping forward and reverse encryption keys are available can be decrypted. As both the forward and reverse encryption keys are recursively generated using respective one way functions, it is not possible to determine forward encryption keys prior to the subscription start period ($T_s$), nor reverse encryption keys after the subscription end period ($T_e$). Therefore decryption of broadcast data is only possible between the subscription start and end times.

This arrangement of providing for decrypting broadcast data is also advantageous compared with known arrangements as only a limited amount of information (the forward and reverse encryption keys, and depending on implementation one way function data) is required to be received by the mobile device, thereby freeing up its limited bandwidth resources for other purposes.

Furthermore, it is possible to broadcast an entire broadcast content, but enable the unsubscribed devices to view only a sample portion by revealing the encryption keys for this portion of the broadcast. The entire broadcast can be stored in the unsubscribed device. Later, after seeing the sample, a user of the device may decide to view the entire or another portion of the broadcast and subscribe accordingly. The broadcast server only needs to send the encryption key pair corresponding to that duration. The user of the device may then view the subscribed portion of the broadcast already stored on the device.

Whilst the embodiments have been described with respect to implementation in a multiple access wireless communications system such as a mobile phone network, alternative implementations are also possible. For example the encryption system could be applied to Internet Broadcasts where streamed content can only be accessed for subscription periods using corresponding forward and reverse encryption key data. Similarly, this broadcast encryption/decryption system and method could be applied to satellite and cable television services. Yet other embodiments might encrypt the contents of a CD or other portable data medium using the recursively generated forward and reverse encryption keys, but provide forward and reverse encryption keys in order to limit access to the content on the CD to a limited duration. This could be used to allow consumers to sample parts of the CD before buying, and then only releasing the initial forward and reverse encryption keys in order to enable decryption of all the data on the CD following payment by the consumer. This later embodiment may be implemented in a way which is unique to each CD, so that in this sense the encryption keys and encrypted data are not broadcast, but are only sent on a one-to-one basis. This reduces the risk that encryption keys common to a series of CD's or DVD's are circulated following payment for and decryption of the first one.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

I claim:

1. A method of encrypting a sequence of data over a sequence of encryption periods, the method comprising:
   generating a sequence of forward encryption keys each associated with a respective encryption period, each forward encryption key generated recursively by applying a forward one way function to the forward encryption key associated with the preceding encryption period;
   generating a sequence of reverse encryption keys each associated with a respective encryption period, each reverse encryption key generated recursively by applying a reverse one way function to the reverse encryption key associated with the subsequent encryption period;
   encrypting the data for each encryption period with a respective forward encryption key and a respective reverse encryption key; and
   transmitting the encrypted sequence of data.

2. A method of encrypting a sequence of data over a sequence of encryption periods as claimed in claim 1, wherein transmitting the encrypted sequence of data comprises broadcasting the encrypted sequence of data.

3. A method of encrypting a sequence of data over a sequence of encryption periods as claimed in claim 2, further comprising:
sending a forward encryption key associated with a start subscription encryption period and a reverse encryption key associated with an end subscription encryption period in response to receiving a subscription request.

4. A method of encrypting a sequence of data over a sequence of encryption periods as claimed in claim 3, further comprising sending forward and reverse one way function data in response to the subscription request.

5. A method of encrypting a sequence of data over a sequence of encryption periods as claimed in claim 1, wherein the forward one way function and/or the reverse one way function are specific to respective encryption periods.

6. A method of decrypting a sequence of data encrypted over a sequence of encryption periods, the method comprising: receiving the encrypted sequence of data;
receiving an initial forward encryption key associated with a respective initial encryption period and receiving an initial reverse encryption key associated with a respective end encryption period;
generating a sequence of forward encryption keys each associated with a respective encryption period, each forward encryption key generated recursively by applying a forward one way function to the forward encryption key associated with the preceding encryption period;
generating a sequence of reverse encryption keys each associated with a respective encryption period, each reverse encryption key generated recursively by applying a reverse one way function to the reverse encryption key associated with the subsequent encryption period;
decrypting the data for each encryption period with a respective forward encryption key and a respective reverse encryption key.

7. A method of decrypting a sequence of data over a sequence of encryption periods as claimed in claim 6, wherein receiving the encrypted sequence of data receiving a broadcast comprising the encrypted sequence of data.

8. A method of decrypting a sequence of data over a sequence of encryption periods as claimed in claim 7, further comprising:
receiving a forward encryption key associated with a start subscription encryption period and a reverse encryption key associated with an end subscription encryption period in response to sending a subscription request.

9. A method of decrypting a sequence of data over a sequence of encryption periods as claimed in claim 6, further comprising receiving forward and reverse one way function data in response to the subscription request.

10. A method of decrypting a sequence of data over a sequence of encryption periods as claimed in claim 6, wherein the forward one way function and/or the reverse one way function are specific to respective encryption periods.

11. An electronic device comprising:
a receiver arranged to receive a sequence of data encrypted over a sequence of encryption periods, an initial forward encryption key associated with a respective initial encryption period, and an initial reverse encryption key associated with a respective and encryption period;
a processor arranged to generate a sequence of forward encryption keys each associated with a respective encryption period, each forward encryption key generated recursively by applying a forward one way function to the forward encryption key associated with the preceding encryption period;
the processor further arranged to generate a sequence of reverse encryption keys each associated with a respective encryption period, each reverse encryption key generated recursively by applying a reverse one way function to the reverse encryption key associated with the subsequent encryption period;
the processor further arranged to decrypt the data for each encryption period with a respective forward encryption key and a respective reverse encryption key.

12. An electronic device as claimed in claim 11, wherein the sequence of data is a wireless broadcast.

13. An electronic device as claimed in claim 11, wherein the initial forward encryption key and the initial reverse encryption key are received in response to a subscription encryption and end subscription encryption periods.

14. An electronic device as claimed in claim11, and further comprising a memory arranged to store at least part of the forward and reverse one way functions.

15. An electronic device as claimed in claim 14, wherein the receiver is further arranged to receive one way function data.

* * * * *